(12) United States Patent
Mizutani et al.

(10) Patent No.: US 11,801,692 B2
(45) Date of Patent: Oct. 31, 2023

(54) PRINTING DEVICE, CONTACT MEMBER, AND DRYING DEVICE

(71) Applicants: Yuuki Mizutani, Kanagawa (JP); Motoaki Saitoh, Tokyo (JP)

(72) Inventors: Yuuki Mizutani, Kanagawa (JP); Motoaki Saitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/753,145

(22) PCT Filed: Sep. 1, 2020

(86) PCT No.: PCT/IB2020/058113
§ 371 (c)(1),
(2) Date: Feb. 22, 2022

(87) PCT Pub. No.: WO2021/044286
PCT Pub. Date: Mar. 11, 2021

(65) Prior Publication Data
US 2022/0281238 A1 Sep. 8, 2022

(30) Foreign Application Priority Data
Sep. 3, 2019 (JP) .................. 2019-160416

(51) Int. Cl.
B41J 11/00 (2006.01)
B41J 2/21 (2006.01)
(Continued)

(52) U.S. Cl.
CPC ......... B41J 11/0024 (2021.01); B41J 2/2107 (2013.01); B41J 3/4078 (2013.01); C09D 11/38 (2013.01)

(58) Field of Classification Search
CPC .... B41J 11/0024; B41J 2/2107; B41J 3/4078; B41J 11/0021; B41J 11/0015; B41J 2/01; C09D 11/38
See application file for complete search history.

(56) References Cited

U.S. PATENT DOCUMENTS

| 5,347,927 A | 9/1994 | Berna et al. |
| 2006/0232624 A1* | 10/2006 | Inoue ................ B41J 11/0035 347/23 |

(Continued)

FOREIGN PATENT DOCUMENTS

| CN | 107664944 | 2/2018 |
| JP | S61-113083 | 5/1986 |

(Continued)

OTHER PUBLICATIONS

Chinese Office Action dated Nov. 14, 2022, in Application No. 202080056961.8, 9 pages.

(Continued)

Primary Examiner — Bradley W Thies
(74) Attorney, Agent, or Firm — Grüneberg and Myers, PLLC

(57) ABSTRACT

A printing device includes a liquid composition having a viscosity of from 2 to 15 mPa·s and a static surface tension of from 20 to 50 mN/m. A liquid composition container contains the liquid composition, a liquid composition applying device is configured to apply the liquid composition to a contact-target member, and a contact member is configured to make contact with a region to which the liquid composition has been applied in the contact-target member. The contact member includes a liquid composition holding layer configured to hold the liquid composition, an adhesive layer that fixes the liquid composition holding layer, and a core, in this order from a side that makes contact with the region.

(Continued)

The liquid composition holding layer has a thickness of from 200 to 1,300 μm.

18 Claims, 2 Drawing Sheets

(51) Int. Cl.
*B41J 3/407* (2006.01)
*C09D 11/38* (2014.01)

(56) References Cited

U.S. PATENT DOCUMENTS

| | | |
|---|---|---|
| 2018/0032004 A1 | 2/2018 | Miyahara et al. |
| 2020/0290372 A1 | 9/2020 | Mizutani |
| 2021/0044049 A1 | 2/2021 | Tsukamoto |

FOREIGN PATENT DOCUMENTS

| | | |
|---|---|---|
| JP | 8-123232 | 5/1996 |
| JP | 2000-227110 | 8/2000 |
| JP | 2006-088486 | 4/2006 |
| JP | 2006-306078 | 11/2006 |
| JP | 2009-037012 | 2/2009 |
| JP | 2011-107729 | 6/2011 |
| JP | 2014-156317 | 8/2014 |
| JP | 2018-020548 | 2/2018 |
| JP | 2019-010833 | 1/2019 |
| JP | 2019-160416 | 9/2019 |
| WO | WO2012/053036 A1 | 4/2012 |

OTHER PUBLICATIONS

International Search Report dated Nov. 4, 2020 in PCT/IB2020/058113 filed on Sep. 1, 2020.
Japanese Office Action dated Apr. 25, 2023, in Japanese Application No. 2019-160416, 3 pages.

* cited by examiner

PRINTING DEVICE, CONTACT MEMBER, AND DRYING DEVICE

CROSS-REFERENCE TO RELATED APPLICATIONS

This application is the National Stage entry under § 371 of International Application No. PCT/IB2020/058113, filed on Sep. 1, 2020, and which claims the benefit of priority to Japanese Application No. 2019-160416, filed on Sep. 3, 2019. The content of each of these applications is hereby incorporated by reference in its entirety.

TECHNICAL FIELD

The present disclosure relates to a printing device, a contact member, and a drying device.

BACKGROUND ART

Printing devices such as inkjet devices include conveying devices that convey print substrates such as cut sheets. These conveying devices convey print substrates to a liquid composition applying device that applies a liquid composition such as inkjet ink, and to a liquid composition heating device that heats and dries the applied liquid composition. Such conveying devices are provided in various forms. In many cases, plural rollers are disposed therebetween along the axial direction.

Some conveying devices make direct contact with regions where the liquid composition has been applied. This contact may cause unwanted transfer of the liquid composition to the conveying devices.

PTL 1 discloses a roller that includes a rod-like core member and a wire rod containing slippery resin fiber helically wound around the outer circumference of the core member. The roller is used to convey a print substrate in a device capable of printing. The roller is used to convey a printing medium in a device capable of printing. This roller smoothly conveys a print substrate and maintains the image quality at a high level.

CITATION LIST

Patent Literature

[PTL 1]
Japanese Unexamined Patent Application Publication No. 2014-156317

SUMMARY OF INVENTION

Technical Problem

However, if a contact-target member such as a recording medium to which a liquid composition has been applied makes contact with a contact member such as a roller, the liquid composition on the contact-target member is transferred to the contact member. Moreover, some liquid composition on the contact member is transferred to and contaminates the contact-target member subsequently conveyed. Such contamination referred to as background fouling. In addition, members constituting the contact member may peel off from the core due to the repetitive contact between the contact-target member and the contact member.

Solution to Problem

The printing device of the present disclosure includes a liquid composition having a viscosity of from 2 to 15 mPa·s and a static surface tension of from 20 to 50 mN/m, a liquid composition container that contains the liquid composition, a liquid composition applying device configured to apply the liquid composition to a contact-target member, and a contact member configured to make contact with a region to which the liquid composition has been applied in the contact-target member, wherein the contact member includes a liquid composition holding layer configured to hold the liquid composition, an adhesive layer that fixes the liquid composition holding layer, and a core in this order from the side that makes contact with the region, wherein the liquid composition holding layer has a thickness of from 200 to 1,300 μm.

Advantageous Effects of Invention

According to the present disclosure, a printing device is provided which minimizes transfer of a liquid composition on a contact member to contact-target members that are sequentially conveyed and prevents a member constituting the contact member from peeling from the core.

BRIEF DESCRIPTION OF DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF EMBODIMENT

Next, an embodiment of the present disclosure is described.

Contact Member

The contact member of the present disclosure make contact with a liquid composition applied region of a contact-target member. The contact member includes a liquid composition holding layer having a structure or material capable of holding a liquid composition, an adhesive layer containing an adhesive member, and a core in this order from the side of the liquid composition applied region of the contact-target member. With the adhesive member, the adhesive layer directly or indirectly fixes the liquid composition holding layer to the core. "Capable of holding a liquid composition" means that it is possible to contain the liquid composition temporally or continuously in the liquid composition holding layer. The liquid composition held in the liquid composition holding layer may be the liquid composition itself or a variation of the liquid composition such as a dried liquid composition. One way of directly fixing the liquid composition holding layer to the core is to integrate the liquid composition holding layer, the adhesive layer, and the core laminated in this order with the adhesive layer formed by curing of the adhesive. One way to indirectly fix the liquid composition holding layer to the core is to form at least one underlying layer between the adhesive layer formed by curing of the adhesive and the core so that the liquid composition holding layer, the adhesive layer, the at least one underlying layer, and the core are laminated and integrated in this order.

Figure 1:
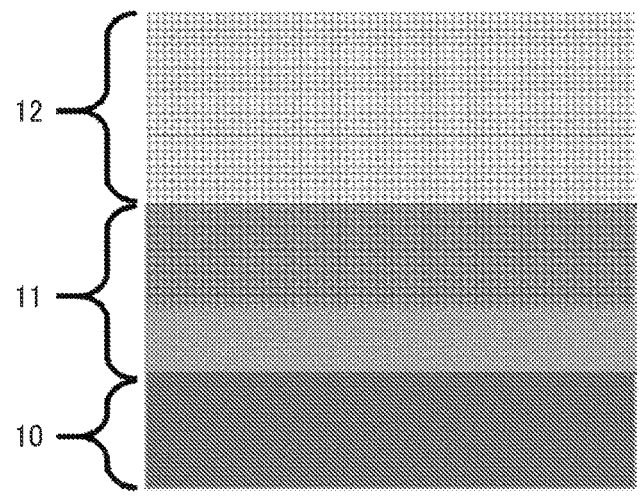
FIG. 1 is a schematic diagram illustrating the positional relation of each layer constituting a contact member.

The positional relation of each layer is described referring to FIG. 1. FIG. 1 is a schematic diagram illustrating the positional relation of each layer constituting a contact member. The contact member illustrated in FIG. 1 includes a core 10, an adhesive layer 11, and the liquid composition holding layer 12. As illustrated in FIG. 1, "the structure or material capable of holding a liquid composition (hatched portion in FIG. 1)" constituting the liquid composition holding layer 12 and "the adhesive member (portion in gray in FIG. 1)" have mixed regions. In the present disclosure, the mixed region is included in the adhesive layer but not in the liquid composition holding layer. The liquid composition holding layer, the adhesive layer, and the core are described below.

Liquid Composition Holding Layer

The liquid composition holding layer has a structure or material capable of holding a liquid composition and preferably has a structure capable of holding a liquid composition. The structure capable of holding a liquid composition is not particularly limited and may include voids that hold a liquid composition attached to the surface of the contact member that have permeated to the inside of the contact member. One such a void structure includes a space formed by entangled fibers or space in porous body. The liquid composition holding layer has a thickness of from 200 to 1,300 µm and preferably from 500 to 1,000 µm. Providing a liquid composition holding layer having a thickness of 200 µm or greater prevents the liquid composition on the surface of the contact member from remaining thereon because the liquid composition holding layer sufficiently absorbs the transferred liquid composition even when the contact-target member to which the liquid composition has been applied make contact with the contact member and the liquid composition on the contact-target member is transferred to the contact member. Such a layer can minimize background fouling caused by further transfer of the liquid composition on the surface of the contact member to contact-target members conveyed sequentially. For example, such background fouling readily occurs when a device carrying the contact member is abruptly suspended, which causes a large amount of the liquid composition to drop from the liquid composition applying device as a result. Because the dropped liquid composition remains undried on the contact-target member, the dropped liquid composition is transferred to the contact member on contact with the contact member when the device is restarted. The liquid composition transferred to the contact member causes background fouling and further peels an image formed on the contact-target member sequentially conveyed when the liquid composition is dried. Providing a liquid composition holding layer having a thickness of 1,300 µm or less prevents the liquid composition holding layer from peeling off from the core 10 even when the contact-target member repeatedly make contact with the contact member.

The contact angle of pure water on the liquid composition holding layer is 120 degrees or more. When the contact angle is 120 degrees or greater, the liquid composition is prevented from remaining on the surface of the contact member and readily permeates the inside of the contact member, which minimizes occurrence of background fouling.

The contact angle of pure water on the liquid composition holding layer can be measured by using a contact angle meter (DMo-501, manufactured by Kyowa Interface Science, Inc.). A total of 10 µl of liquid droplets is dripped to the surface of a measuring target and the contact angle thereof at 5,000 ms after the dripping is measured at 25 degrees C. If the liquid composition holding layer is attached to a core having a roller form, meaning that the liquid composition holding layer is not planar, the liquid composition holding layer is peeled from the core and is attached to a flat plate with a flat tape before measuring.

The material of the liquid composition holding layer is not particularly limited and is preferably a fluororesin. Concisely, a fluororesin fiber layer is preferable which has a surface containing at least a fluororesin fiber which makes contact with a contact-target member. The use of fluororesin fiber improves lubricity and releasability of the contact-target member that makes direct contact with the fluororesin fiber against a liquid composition applied region. Examples of the fluororesin forming the fluororesin fiber include, but are not limited to, a tetrafluoroethylene-perfluoroalkylvinyl ether copolymer (PFA, melting point: 300 to 310 degrees C.), polytetrafluoroethylene (PTFE, melting point: 330 degrees C.), a tetrafluoroethylene-hexafluoropropylene copolymer (FEP, melting point: 250 to 280 degrees C.), an ethylene-tetrafluoroethylene copolymer (ETFE, melting point: 260 to 270 degrees C.), polyvinylidene fluoride (PVDF, melting point: 160 to 180 degrees C.), polychlorotrifluoroethylene (PCTFE, melting point: 210 degrees C.), a tetrafluoroethylene-hexafluoropropylene-perfluoroalkylvinyl ether copolymer (EPE, melting point: 290 to 300 degrees C.), and copolymers including such polymers. Of these, PTFE is preferable.

The fluororesin fiber is formed by spinning such fluororesin or solidifing short fibers. The fluororesin fiber may be formed of a single type of fluororesin, a resin fiber formed of plural types of fluororesins, or a resin fiber formed of at least one type of fluororesin mixed with a material other than the fluororesin. Of these, the fluororesin fiber formed of a single or a plural types of fluororesins are preferable.

Specific examples of procurable fluororesin fibers include, but are not limited to, TOYOFLON BF800S, 2402, and 1412 (manufactured by Toray Industries, Inc.), each of which contains PTFE.

The form of the liquid composition holding layer is not particularly limited and preferably a sheet-like form wound around a core. The sheet-like form means that the liquid composition holding layer obtained through a process of making fibers less likely to be separated from each other has a flat-surface form or a curved-surface form. This sheet-like form does not include a linear form. The fiber less likely to be separated from each other is produced by, for example, a known process, such as a process of mechanically weaving fibers provided by spinning a raw material by extrusion, or a process of bonding fibers together by, for example, heat or pressure. A process of bonding together relatively short fibers is preferably employed because while the contact area is decreased, the number of contact points is increased. When the liquid composition holding layer has a sheet-like form, portions of the contact member that make contact with the contact-target member are the apex portions of fluororesin fibers positioned outermost of the liquid composition holding layer. Because many apexes of the fiber can be present at the surface of the contact member while reducing the contact area between the contact member and the contact-target member, the surface pressure from the contact-target member can be finely distributed, which reduces background fouling even when the contact member make contact with the liquid composition applied region. A non-woven fabric formed of materials such as resin fibers is preferable as the liquid composition holding layer having a sheet-like form. A non-woven fabric liquid composition holding layer can further reduce the occurrence of background fouling because the surface pressure from the contact-target member can be finely distributed. Although the present embodiment does not exclude a form of the liquid composition holding layer formed by winding linear fluororesin fibers multiple times around a core with mutually adjacent to each other, the above-mentioned sheet-like form is preferable. A sheet-like liquid composition holding layer can distribute the pressure between a contact member and a contact-target member and reduce background fouling in comparison with a linear liquid composition holding layer.

The peeling force required to peel off a liquid composition holding layer from a core is preferably 6 N/cm or greater. When the peeling force is 6 N/cm or greater, a decrease in adhesion force can be reduced between a liquid composition holding layer and a core or an underground layer. The peeling force in the present embodiment can be measured as follows: make a cut in a liquid composition holding layer provided onto a contact member; and measure the peeling stress at 90 degrees at the cut portion of the liquid composition holding layer at a speed of 100 mm/5 seconds. To be more concise, place a razor vertically to a liquid composition holding layer provided onto a contact member and make a cut in a region (evaluation region) having a width of 30 mm and a length of 100 mm. Next, grip the end part on the side having a short width in the evaluation region using a digital force gauge (manufactured by A & D Company, Limited) and measure the peeling force under the conditions mentioned above. The maximum value in the measuring distance within 100 mm is defined as the measuring value. In the measuring, three different evaluation regions having different positions are created and the measuring values for each region are averaged. This calculated average is adopted as the peeling force.

Adhesive Layer

The adhesive layer includes an adhesive member formed by curing an adhesive. The adhesive member fixes directly or indirectly the liquid composition onto the core. Specific examples of the adhesive member constituting the adhesive layer include, but are not limited to, organic adhesives such as a silicone-based adhesive, an epoxy-based adhesive, and an acrylic-based adhesive and an inorganic adhesives such as an Si-based adhesive. Of these, adhesive-members derived from a silicone-based adhesive are preferable. The silicone-based adhesive is preferable because it is not readily breakable due to resilience achieved after curing. The adhesive may be thermocurable or room-temperature curable. The former is preferable to the latter. In the case of a thermocurable type, a liquid composition holding layer to which an adhesive is applied is placed and then cured. The thickness of the adhesive layer can be made thus even, which prevents the liquid composition holding layer from peeling off from the core.

The proportion of the thickness of the adhesive layer to the thickness of the liquid composition holding layer is preferably from 3 to 50 percent and more preferably from 10 to 40 percent. When the proportion is from 3 to 50 percent, the liquid composition holding layer is not readily peeled off from the core.

The methods for identifying and measuring the liquid composition holding layer and the adhesive layer are described below. These methods are not particularly limited.

One such a method is a cross-section observation using an SEM. For example, a contact member is divided by a razor and the portion in which voids are present is determined as a liquid composition holding layer and the portion in which voids have disappeared due to impregnation of the adhesive member is determined as an adhesive layer. The thickness of each layer is measured based on images.

To be more concise, in a predetermined observation region, create a line passing the position farthermost from the core in the mixed region of a structure or material that can hold the liquid composition, a contact member, and others and in parallel to the surface of the core. The region above this line, i.e., on the surface side, is classified as the liquid composition holding layer and the region below this line to the core is classified as the adhesive layer and the thickness of each layer is measured.

It is possible to make observation at one point and preferably multiple points. The proportion of the thickness of the adhesive layer to the thickness of the liquid composition holding layer is preferably from 3 to 50 percent and more preferably from 10 to 40 percent at each observation point. When the proportion is satisfied at each observation point, the liquid composition holding layer is prevented from peeling off from the core. When the contact member has a roller form, the multiple observation points are preferably determined like at a position at 1 cm inside one end of a contact member, the center of the contact member, and at a position at 1 cm inside the other end of the contact member. It is more preferable to select the points spaced 120 degrees apart on the circumference of a contact member for each of the three positions mentioned above (9 points in total). When the liquid composition holding layer has a sheet-like form, the portion from the end part of the sheet to less than 1 cm from the end part is preferably not to be selected for observation.

Core

The core is preferably a long rod-like metal member and the roller metal member more preferably has a cylindrical or tubular form having a circular or substantially circular cross section and similar solids such as a roller form. When the core has such a form, the contact member can be used as a roller to convey the contact-target member. When the contact member is used as a roller, the diameter of the circle of the cross section of a core is preferably from 50 to 100 nm. In a case where the diameter is in this range, when the contact member makes contact with the liquid composition applied region of the contact-target member, the liquid composition on the contact-target member is not readily transferred onto the contact member. When the diameter is 50 µm or more, the pressure per unit area between the contact member and the contact-target member is decreased, so that the liquid composition is not readily transferred. When the diameter is 100 µm or less, slipping between the contact member and the contact-target member is reduced, so that the liquid composition is not readily transferred. "similar solids" mentioned above is preferably like a form with the diameter of the cross section tapering (decreasing) from both ends toward the center. Such a form can relax attachment between the contact member and the contact-target member, which minimizes peeling of an image.

Examples of the raw material for the core include various metals such as stainless steel and aluminum, sintered bodies of metals such as copper and stainless steel, and ceramic sintered bodies.

Drying Device and Printing Device

The drying device of the present embodiment dries a contact-target member to which a liquid composition has been applied and includes a contact member and optionally other members such as a liquid composition heating device that heats the liquid composition that has been applied to the contact-target member and a contact member heating device that heats the contact member.

The printing device of the present embodiment includes a liquid composition, an accommodating unit that accommodates the liquid composition, a liquid composition applying device configured to apply the liquid composition to a contact-target member, a contact member, and other optional devices such as a contact-target member supply device configured to supply a contact-target member, a conveyance path where the contact-target member is conveyed, a liquid composition heating device configured to heat the liquid composition that has been applied to the contact-target member, a contact member heating device configured to heat the contact member, and a contact-target member retrieving device configured to retrieve the contact-target member.

Figure 2:
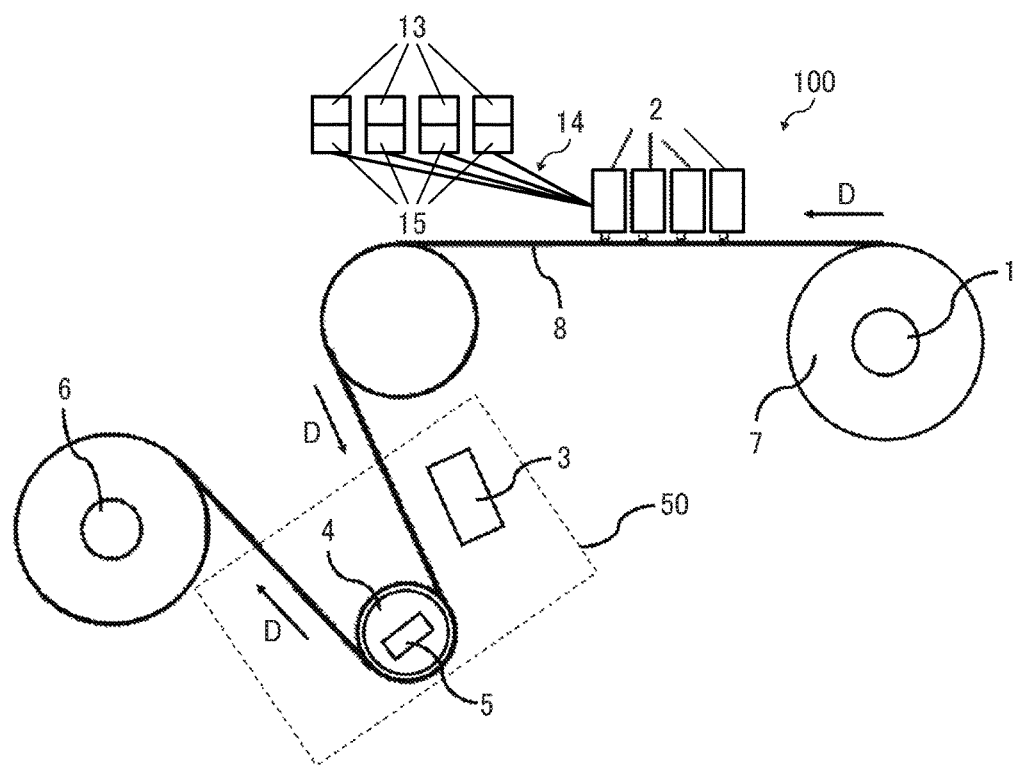
FIG. 2 is a schematic diagram illustrating a printing device using continuous paper.

The drying device and the printing device are described with reference to FIG. 2. FIG. 2 is a schematic diagram illustrating a printing device using continuous paper according to an embodiment. A printing device 100 illustrated in FIG. 2 includes a contact-target member supply device 1, a liquid composition applying device 2, a liquid composition heating device 3, a contact member 4, a contact member heating device 5, and a contact-target member retrieving device 6. The printing device 100 includes a drying device 50, which may be separated from the printing device 100.

Contact-Target Member Supply Device

The contact-target member supply device 1 is rotationally driven to supply the contact-target member 7 wound into a roll form to a conveyance path 8 in the printing device 100. The conveying directions of the contact-target member 7 in the conveyance path 8 are indicated by arrows D.

The rotational driving of contact-target member supply device 1 is controlled so as to convey the contact-target member 7 at a high speed of 50 m/min or greater. The opportunities of contact between the undried liquid composition on the contact-target member and the contact member increase at high speed conveyance of the contact-target member 7 in comparison with low speed conveyance. The liquid composition transferred to the contact member has a large adverse impact on background fouling accordingly. The printing device of the present embodiment is thus preferably used to minimize background fouling.

The contact-target member 7 is a sheet-like formed conveying item continuously extending in the conveying direction D of the printing device 100, specifically, a recording medium such as continuous paper. Examples of the continuous paper include, but are not limited to, machine-glazed paper wound into a roll form, and regularly folded fanfold paper. The contact-target member 7 is conveyed along the conveyance path 8, which extends between the contact-target member supply device 1 and the contact-target member retrieving device 6. The length of the contact-target member 7 in the conveying direction D is at least greater than the length of the conveyance path 8 between the contact-target member supply device 1 and the contact-target member retrieving device 6. The printing device 100 according to the present embodiment is configured to use the contact-target-member 7, which continuously extends in the conveying direction D of the printing device 100, and configured to convey the contact-target member 7 at a high speed. Therefore, a high tension is applied to the contact-target member 7 between the contact-target-member supply device 1 and the contact-target member retrieving device 6. Because the contact-target member is a continuous sheet conveyed in the conveying direction D, it makes contact with the contact member more frequently than non-continuous conveyed item (e.g., cut sheet). The liquid composition transferred to the contact member has a large adverse impact on background fouling accordingly. The printing device of the present embodiment is thus preferably used to minimize background fouling.

Liquid Composition Applying Device

The liquid composition applying device 2 is an inkjet discharging head including a plurality of nozzle arrays, each including plural nozzles. This inkjet discharging head is disposed such that discharging of ink from the nozzles is directed to the conveyance path 8 of the contact-target member 7. Therefore, the liquid composition applying device 2 sequentially discharges, as a liquid composition to the contact-target member 7, inks of colors of magenta (M), cyan (C), yellow (Y), and black (K), and a post-processing solution applied to protect the surface of the provided inks. The colors of the inks discharged are not limited to these colors, and may be, for example, white, gray, silver, gold, green, blue, orange, or violet.

A liquid composition 15 is discharged from the liquid composition applying device 2 and accommodated in an accommodating unit (liquid composition container) 13 such as an ink cartridge. The liquid composition applying device 2 is linked with the accommodating unit 13 via a supplying device 14 such as a tube and the liquid composition 15 is fed from the accommodating unit 13 to the liquid composition applying device 2. This embodiment has been described with an example in which the liquid composition is the inks and the post-processing solution. Alternatively, another liquid composition may be used. Examples of the liquid composition include, but are not limited to, ink, a pre-processing solution applied to aggregate coloring material contained in ink, a post-processing solution applied to protect the surface of applied ink, a liquid containing dispersed inorganic particles such as metal particles and used for forming, for example, electric circuits, and appropriate combinations of the foregoing such as mixtures and overlapped liquids.

This embodiment has been described with an example in which the liquid composition 15 is provided with an inkjet discharging head to the contact-target member 7. Alternatively, the liquid composition 15 may be applied by another device. Specific examples include, but are not limited to, various known methods such as spin coating, spray coating, gravure roll coating, reverse roll coating, and bar coating.

Liquid Composition Heating Device

The liquid composition heating device 3 heats and dries the liquid composition 15 applied to the contact-target member 7 from the rear side of the surface having a region of the contact-target member 7 to which the liquid composition 15 has been applied. The device for drying the liquid composition is not particularly limited and includes known devices such as a device for blowing hot air and a device for bringing the rear surface of the contact-target member 7 into contact with a heating device such as a heating roller or a flat heater.

Contact Member

The contact member 4 is configured to convey the contact-target member 7 and change the conveying direction D of the contact-target member 7. The contact member 4 is a solid or hollow cylindrical roller.

The contact-target member supply device 1 is configured to convey the contact-target member 7 at 50 m/min or more in the printing device 100 of the present embodiment as described above. A high pressure is applied between the contact member 4 and the contact-target member 7 when the conveying direction of the contact-target member 7 is changed using the contact member 4 as illustrated in FIG. 2. The liquid composition 15 on the contact-target member 7 is readily transferred to the liquid composition holding layer in the contact member 4 under this high pressure so that background fouling tends to occur. The liquid composition holding layer in the contact member 4 readily peels off from the core 10. It is thus suitable to use the contact member of the present embodiment.

Because the printing device 100 of the present embodiment is configured to use the contact-target member 7, which continuously extends in the conveying direction D of the printing device 100, and configured to convey the contact-target member 7 at a high speed, a high tension is applied to the contact-target member 7 between the contact-target member supply device 1 and the contact-target member retrieving device 6. In such a case, a high pressure is applied between the contact member 4 and the contact-target member 7 when the contact member 4 changes the conveying direction of the contact-target member 7 under such a high tension as illustrated in FIG. 2. The liquid composition on the contact-target member 7 is readily transferred to the liquid composition holding layer in the contact member 4 under this high pressure so that background fouling tends to occur. In addition, the liquid composition holding layer in the contact member 4 readily peels off from the core. It is thus suitable to use the contact member of the present embodiment.

The contact member 4 is disposed downstream of the liquid composition heating device 3 in the conveying direction D of the contact-target member 7 as illustrated in FIG. 2. This configuration is preferable to minimize transferring of the liquid composition 15 to the contact member 4 because the liquid composition heating device 3 dries the liquid composition 15 on the contact-target member 7 and thereafter the contact member 4 makes contact with the region of the contact-target member 7 to which the liquid composition 15 has been applied.

The contact member 4 is preferably the first contact member to the liquid application applied region in the contact-target member 7 after the liquid composition 15 is applied to the contact-target member 7. The liquid composition 15 on the contact-target member 7 is readily transferred onto the member that first makes contact with the liquid composition applied region of the contact-target member 7. For this reason, the contact member according to this embodiment is suitably used to prevent this transfer.

When the contact member 4 is a roller, the contact-target member 7 is wound around the roller so that the roller makes contact with the liquid composition applied region of the contact-target member 7 as illustrated in FIG. 2. At this point in time, the winding ratio of the contact-target member 7 to the roller is preferably 10 percent or more, more preferably 15 percent or more, and furthermore preferably 20 percent or more. When the winding ratio is 10 percent or more, the pressure per unit area occurring between the roller and the contact-target member 7 decreases, thereby reducing transfer of the liquid composition 15 onto the roller. The winding ratio of the contact-target member 7 to the roller is preferably 90 percent or less, more preferably 70 percent or less, and furthermore preferably 50 percent or less. When the winding ratio is 50 percent or less, the contact-target member 7 is suitably conveyed.

Figure 3:
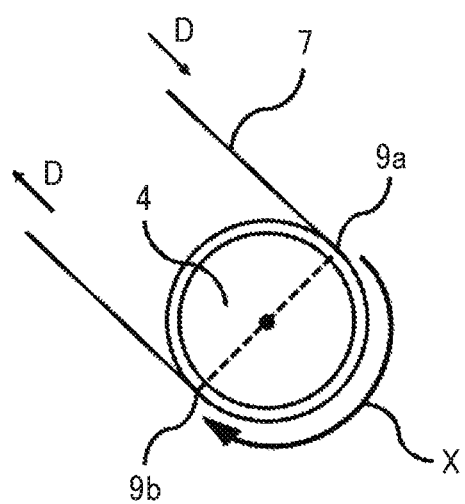
FIG. 3 is a schematic diagram illustrating the contact-target member in contact with the contacting member.

The "winding ratio" in the present embodiment will be described with reference to FIG. 3. FIG. 3 is a schematic diagram illustrating the contact-target member in contact with the contact member. As illustrated in FIG. 3, when the contact-target member 7 is in contact with the contact member 4 having a roller form in a winding manner, the "winding ratio" represents the ratio of X to the whole circumference of the contact member 4, where X represents the circumference of the portion of the contact member 4 between an end 9a and the other end 9b where the contact-target member 7 is separated from the contact member 4 on the side on which the contact member 4 and the contact-target member 7 make contact with each other.

Contact-Member Heating Device

The contact-member heating device 5 is configured to heat the contact member 4. The liquid composition applied region on the contact-target member 7 is dried when the heated contact member 4 makes contact with the liquid composition applied region of the contact-target member 7. At this point in time, the liquid composition 15 to the contact member 4 tends to be unfavorably transferred because of the undried liquid composition 15 and the resin softened by heat in the liquid composition 15. It is thus suitable to use the contact member according to the present embodiment.

The contact-member heating device 5 may be selected from various known devices such as heaters and devices for blowing hot air.

The contact-member heating device 5 may be disposed inside or outside of the contact member 4 as illustrated in FIG. 2. The contact-member heating device 5 may be separated from or integrated into the contact member 4. Heat or hot air generated by the contact-member heating device 5 can be efficiently delivered to the contact-target member 7 when the core of the contact member 4 is a porous body and the contact-member heating device 5 is disposed inside of the contact member 4.

Contact-Target Member Retrieving Device

The contact-target member retrieving device 6 is rotationally driven to wind up the contact-target member 7 having images formed with the liquid composition 15, which is stored in a roll form.

Printing Method

The printing method according to an embodiment of the present disclosure includes applying a liquid composition to a contact-target member and bringing a contact member into contact with the region of the contact-target member to which the liquid composition has been applied. The printing method may optionally include heating the liquid composition.

Liquid Composition Application Process

In the liquid composition application process, a liquid composition such as ink is applied to the contact-target member 7 fed from the contact-target member supply device 1. A liquid composition applied region on the contact-target member 7 is formed in this process.

Liquid Composition Heating Process

The liquid composition is heated and dried in the liquid composition heating process after the liquid composition application process. In one example, the liquid composition is dried until the recording medium does not feel tacky. In the drying process illustrated in FIG. 2, the applied liquid composition is dried with the liquid composition heating device 3. Alternatively, the applied liquid composition may be naturally dried without such a special drying device.

Contact Process

The contact member 4 is brought into contact with the liquid composition applied region of the contact-target member 7 in the contact process. The liquid composition applied region means the liquid composition applied surface of the contact-target member 7, but excludes a region on the other side where the liquid composition is not applied. The liquid composition applied region can be determined by the application of the liquid composition and the state of the liquid composition does not matter. In other words, when the contact member is brought into contact with a liquid composition applied region, the liquid composition does not necessarily keep the liquid state as the liquid composition is applied to the region. The liquid composition includes a liquid or solid state in which all or part of the liquid components have been evaporated. The contact-target member 7 is conveyed while in contact with the contact member 4 as illustrated in FIG. 2. The contact member 4 conveys the contact-target member 7 such that the contact-target member 7 is wound around the contact member 4 so that the conveying direction D of the contact-target member 7 changes. When the contact-member heating device 5 is disposed inside or near the contact member 4, the contact member 4 dries the liquid composition applied region on the contact-target member 7 while conveying the contact-target member 7.

Liquid Composition

The liquid composition in the present embodiment is not particularly limited. Examples include, but are not limited to ink, a pre-processing solution applied to aggregate a coloring material contained in ink, a post-processing solution applied to protect the surface of applied ink, and a liquid dispersion containing inorganic particles such as metal particles for forming electric circuits and others. These liquid compositions may be appropriately used in accordance with known formulations.

Properties of Liquid Composition

The liquid composition has a viscosity of from 2 to 15 mPa·s and preferably from 2 to 10 mPa·s. The liquid composition holding layer can stably hold a liquid composition having a viscosity of 2 mPa·s or greater. The liquid composition on the surface of a contact member readily permeates into the liquid composition holding layer when the viscosity is 15 mPa·s or less. The liquid composition has a static surface tension of from 20 to 50 mN/m and preferably from 20 to 35 mN/m. The liquid composition holding layer can stably hold a liquid composition having a static surface tension of 20 mN/m or greater. The liquid composition on the surface of a contact member readily permeates into the liquid composition holding layer when the static surface tension is 50 mN/m or less.

A liquid composition having a viscosity of from 2 to 15 mPa·s and a static surface tension of rom 20 to 50 mN/m minimizes occurrence of background fouling.

Ink

Below is a description of ink used as an example of the liquid composition. The ink preferably contains an organic solvent, water, a coloring material, a resin, a wax, and an additive.

Organic Solvent

The organic solvent is not particularly limited and water-soluble organic solvents can be used. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of polyolhydric alcohols include, but are not limited to, ethylene glycol, diethylene glycol, 1,2-propanediol, 1,3-propanediol, 1,2-butanediol, 1,3-butanediol, 1,4-butane diol, 2,3-butanediol, 3-methyl-1,3-butanediol, triethylene glycol, polyethylene glycol, polypropylene glycol, 1,2-pentanediol, 1,3-pentanediol, 1,4-pentanediol 2,4-pentanediol, 1,5-pentanediol, 1,2-hexanediol, 1,6-hexanediol, 1,3-hexanediol, 2,5-hexanediol, 1,5-hexanediol, glycerin, 1,2, 6-hexanetriol, 2-ethyl-1,3-hexanediol, ethyl-1,2,4-butanetriol, 1,2,3 -butanetriol, 2,2,4-trimethyl-1,3-pentanediol, and petriol.

Specific examples of the polyhydric alcohol ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazoline, ε-caprolactam, and γ-butylolactone.

Specific examples of the amide include, but are not limited to, formamide, N-methylformamide, N,N-dimethylformamide, 3-methoxy-N,N-dimethyl propionamide, and 3-butoxy-N,N-dimethyl propionamide.

Specific examples of amines include, but are not limited to, monoethanolamine, diethanolamine, and triethylamine.

Specific examples of the sulfur-containing compounds include, but are not limited to, dimethyl sulphoxide, sulfolane, and thiodiethanol.

Specific examples of the other organic solvents include, but are not limited to, propylene carbonate and ethylene carbonate.

It is preferable to use an organic solvent having a boiling point of 250 or lower degrees C., which serves as a humectant and imparts a good drying property at the same time.

Polyol compounds having eight or more carbon atoms and glycol ether compounds are also suitably used as the organic solvent. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

In particular, if a resin is used as the ink composition, N,N-dimethyl-β-buthoxypropionamide, N,N-dimethyl-β-ethoxypropionamide, 3-ethyl-3-hydroxymethyloxetane, and propylene glycol monomethylether are preferable. These can be used alone or in combination. Of these, amide solvents such as 3-buthoxy-N,N-dimethyl propionamide and 3-methoxy-N,N-dimethyl propionamide are particularly preferable to promote film-forming property of a resin and demonstrate better abrasion resistance.

The boiling point of the organic solvent is preferably from 180 to 250 degrees C. When the boiling point is 180 degrees C. or higher, the evaporation speed during drying can be suitably controlled, leveling is sufficiently conducted, surface roughness is reduced, and gloss is improved. Conversely, when the boiling point is higher than 250 degrees C., drying is not good so that drying takes a longer time. According to the advancement of print technologies, the time spent for drying becomes a rate limiting factor. The drying time should be shortened and long drying time is not favorable.

The proportion of the organic solvent in the ink has no particular limit and can be suitably selected to suit to a particular application.

In terms of drying and discharging reliability of the ink, the proportion is preferably from 10 to 60 percent by mass and more preferably from 20 to 60 percent by mass.

The proportion of the amide solvent in the ink is preferably from 0.05 to 10 percent by mass and more preferably from 0.1 to 5.0 percent by mass.

Water

The proportion of water in the ink is not particularly limited and can be suitably selected to suit to a particular application. In terms of drying and discharging reliability of the ink, the proportion is preferably from 10 to 90 percent by mass and more preferably from 20 to 60 percent by mass.

Coloring Material

The coloring material has no particular limitation. For example, pigments and dyes are suitable.

Inorganic pigments or organic pigments can be used as the pigment. These can be used alone or in combination. Also, mixed crystals are usable as the pigments.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable.

Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

Ink can be obtained by dispersing a pigment. The pigment can be dispersed in ink by a method of introducing a hydrophilic functional group into a pigment to prepare a self-dispersible pigment, a method of coating the surface of a pigment with a resin followed by dispersion, or a method of using a dispersant to disperse a pigment, and other methods.

One way to prepare a self-dispersible pigment by introducing a hydrophilic functional group into a pigment is to add a functional group such as a sulfone group and carboxyl group to a pigment (e.g., carbon) to disperse the pigment in water.

One way to disperse a resin by coating the surface thereof is to encapsulate a pigment in a microcapsule to make it disperse in water. This can be referred to as a resin-coated pigment. In this case, all the pigments to be added to ink are not necessarily entirely coated with a resin. Pigments never or partially coated with a resin may be dispersed in the ink.

When a dispersant is used, a known dispersant having a small or large molecular weight represented by a surfactant is used.

It is possible to select an anionic surfactant, a cationic surfactant, a nonionic surfactant, an amphoteric surfactant, or others depending on a pigment.

A nonionic surfactant (RT-100, manufactured by TAKEMOTO OIL & FAT CO., LTD.) and a formalin condensate of naphthalene sodium sulfonate are suitably used as the dispersant.

Those can be used alone or in combination.

Pigment Dispersion

The ink can be obtained by mixing a pigment with materials such as water and an organic solvent. It is also possible to mix a pigment with water, a dispersant, and other substances to prepare a pigment dispersion and thereafter mix the pigment dispersion with materials such as water and an organic solvent to manufacture an ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be analyzed using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with an instrument such as a filter and a centrifuge to remove coarse particles followed by degassing.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins can be also used. It is possible to mix a resin emulsion in which such resin particles are dispersed in water as a dispersion medium with materials such as a coloring material and an organic solvent to obtain an ink. The resin particle can be synthesized or procured. The resin particle can be used alone or in combination.

Of the above-described examples, urethane resin particles are used together with other resin particles in one example because urethane-resin-particle ink provides images having high tackiness, which degrades blocking resistance. However, such high tackiness of urethane resin particles enables formation of strong images and enhancement of fixing properties. In particular, for urethane resin particles that have a glass transition temperature (Tg) of −20 to 70 degrees C., images formed with ink containing these urethane resin particles have higher tackiness and better fixing properties.

Of the above-described resins, acrylic resin particles formed of acrylic resin have high discharging stability and are also inexpensive, so that they are widely used. However, since acrylic resin particles have low abrasion resistance, and hence are used together with elastic urethane resin particles in one example.

The mass ratio (urethane resin particles/acrylic resin particles) of the urethane-resin-particle content (percent by mass) to acrylic-resin-particle content (percent by mass) is preferably from 0.03 to 0.70, more preferably from 0.10 to 0.70, and furthermore preferably from 0.23 to 0.46.

The mean volume diameter (i.e., volume average particle diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to obtain good fixability and image robustness. The mean volume diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of the ink, it is preferably from 1 to 30 percent by mass and more preferably from 5 to 20 percent by mass of the total amount of the ink.

The particle diameter of the solid portion in the ink has no particular limit and can be selected to suit to a particular application. The maximum frequency of the particle diameter of the solid portion in the ink is preferably from 20 to 1000 nm and more preferably from 20 to 150 nm in the maximum number conversion to enhance discharging stability and image quality such as image density. The solid portion includes particles such as resin particles and pigment particles. The particle diameter can be measured by using a particle size analyzer (Nanotrac Wave-UT151, manufactured by MicrotracBEL Corp).

Wax

Inclusion of wax in ink enhances abrasion resistance and the gloss degree can be enhanced when used in combination with a resin. The wax is preferably a polyethylene wax. The polyethylene wax can be procured. Specific examples include, but are not limited to, AQUACER 531 (manufactured by BYK Japan KK), Polyron P502 (manufactured by Chukyo Yushi Co., Ltd.), Aquapetro DP2502C (manufactured by TOYO ADL CORPORATION), and Aquapetro DP2401 (manufactured by TOYO ADL CORPORATION). These can be used alone or in combination.

The proportion of the polyethylene wax is preferably from 0.05 to 2 percent by mass, more preferably from 0.05 to 0.5 percent by mass, and furthermore preferably from 0.05 to 0.45 percent by mass, and particularly preferably from 0.15 to 0.45 percent by mass to the total content of ink. When the proportion is from 0.05 to 2 percent by mass, abrasion resistance and gloss are sufficiently improved. In addition, when the proportion is 0.45 percent by mass or less, storage stability and discharging stability of ink become particularly good and such ink is suitable for an inkjet printing method.

Additive

Additives such as a surfactant, a defoaming agent, preservative and fungicide, corrosion inhibitor, and pH regulator can be added to the ink.

Post-Processing Fluid

Below is a description of a case where a post-processing fluid is used as another example of the liquid composition.

The post-processing fluid has no particular limit. It is preferable that the post-processing fluid can form a transparent layer. The post-processing fluid is obtained by suitably selecting and mixing the same material such as organic solvents, water, wax, resins, surfactants, defoaming agents, pH regulators, preservatives and fungicides, and corrosion inhibitors as for the ink based on a necessity basis. The post-processing solution may be applied to the entire region of a contact-target member or may be applied to an ink-applied region alone.

Contact-Target Member

The contact-target member is not particularly limited, and may be selected from recording media such as normal paper, glossy paper, specialty paper, and cloth. In one example, the contact-target member is particularly suitable for low-permeable recording media (also referred to as low-absorption recording media).

The low-permeable recording medium has a surface with low moisture permeability, absorbency, and/or adsorption property and includes a material having many hollow spaces inside that are not open to the outside. Examples of the low-permeable recording medium include, but are not limited to, coated paper for use in commercial printing and a recording medium like coated paper board having a middle layer and a back layer mixed with waste paper pulp. In the case of such a low-permeable recording medium, when the liquid composition applied region on the contact-target member comes into contact with the contact member, the liquid composition tends to be transferred onto the contact member. To prevent this transfer, the contact member according to this embodiment is suitably used.

Low-Permeable Recording Medium

The low-permeable recording medium includes a substrate, a surface layer (application layer) provided to at least one surface of the substrate, and other optional layers. One such a recording medium is coated paper.

The low-permeable recording medium minimally absorbs a liquid composition applied thereto, undried liquid composition readily remains on the low-permeable recording medium, and the liquid composition tis readily transferred to a contact member. The low-permeable recording medium is vulnerable to background fouling. It is thus suitable to use the printing device of the present embodiment when a low-permeable recording medium is used as the contact-target member.

The recording medium including the substrate and the surface layer preferably has a transfer amount of pure water to the recording medium of from 2 to 35 mL/m$^2$ and more preferably from 2 to 10 mL/m$^2$ during a contact time of 100 ms as measured by a liquid dynamic absorptometer.

When the transfer amount of the ink and pure water during a contact time of 100 ms is too small, beading tends to occur. When the transfer amount is too large, the ink dot diameter tends to be smaller than desired after image forming.

The transfer amount of pure water to the recording medium is from 3 to 40 mL/m$^2$ and preferably from 3 to 10 mL/m$^2$ during a contact time of 400 m as measured by a liquid dynamic absorption tester.

When the transfer amount during the contact time of 400 ms is small, drying becomes insufficient. When the transfer amount is too much, gloss of the image portion tends to be low after drying. The transfer amount of pure water to the recording medium during a contact time of 100 ms and 400 ms can be measured at the surface on which the surface layer is provided in both transfer amounts.

This dynamic scanning absorptometer (KUGA, Shigenori, Dynamic scanning absorptometer (DSA); Journal of JAPAN TAPPI, published in May 1994, Vol. 48, pp.88-92) can accurately measure the liquid amount absorbed in an extremely small period of time. This dynamic scanning absorptometer automates the measuring utilizing the method of directly reading the absorption speed of liquid from moving of meniscus in a capillary, spirally scanning an imbibition head on a sample having a disc-like form, and measuring the required number of points on the single sample while automatically changing the scanning speed according to predetermined patterns.

The liquid supply head for a paper sample is connected with the capillary via a TEFLON® tube and the position of the meniscus in the capillary is automatically read by an optical sensor. Specifically, the transfer amount of pure water or ink can be measured using a dynamic scanning absorptometer (K350 Series D type, manufactured by Kyowa Seiko Co., Ltd.).

Each of the transfer amount during the contact time of 100 ms and 400 ms can be obtained by interpolation from the measuring results of the transfer amount in the proximity contact time of the contact time.

Substrate

There is no specific limitation to the selection of the substrate and it can be suitably selected to suit to a particular application. For example, paper mainly formed of wood fiber and a sheet material such as non-woven cloth mainly formed of wood fiber and synthetic fiber are usable. There is no specific limit to the thickness of the substrate. The layer thickness thereof can be determined and preferably ranges from 50 to 300 The weight of the substrate is preferably from 45 to 290 g/m$^2$.

Surface Layer

The surface layer contains a pigment, a binder, and other optional components such as a surfactant.

As the pigments, inorganic pigments or a combination of inorganic pigments and organic pigments can be used. Specific examples of the inorganic pigments include, but are not limited to, kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite. The addition amount of the inorganic pigment is preferably 50 parts by mass or more based on 100 parts by mass of the binder.

Specific examples of the organic pigments include, but are not limited to, water-soluble dispersions of styrene-acrylic copolymer particles, styrene-butadiene copolymer particles, polystyrene particles, and polyethylene particles. The addition amount of the organic pigment is preferably from 2 to 20 parts by mass based on 100 parts by mass of all the pigments in the surface layer.

As the binder resin, aqueous resins are preferable. As the aqueous resins, at least one of water-soluble resins and water-dispersible resins are preferable. The water-soluble resin is not particularly limited and can be suitably selected to suit to a particular application. Examples thereof include polyvinyl alcohol, cation-modified polyvinyl alcohol, acetal-modified polyvinyl alcohol, polyester, and polyurethane.

The surfactant optionally contained in the surface layer is not particularly limited and can be suitably selected to suit to a particular application. Anionic active agents, cationic active agents, amphoteric active agents, and non-ionic active agent can be used.

The method of forming the surface layer is not particularly limited and can be suitably selected to suit to a particular application. For example, methods are utilized in which a liquid that forms the surface layer on a substrate is applied to the substrate or a substrate is immersed in a liquid that forms the surface layer. The attachment amount of the liquid forming the surface layer is not particularly limited and can be suitably selected to suit to a particular application. The attachment amount of the solid portion preferably ranges from 0.5 to 20 g/m² and more preferably from 1 to 15 g/m².

EXAMPLES

Next, the present disclosure is described in detail with reference to Examples but is not limited thereto.

Preparation Example of Black Pigment Dispersion

A total of 20 g of carbon black (NIPEX 160, manufactured by Degussa, BET specific surface area: 150 m²/g, average primary particle size: 20 nm, pH: 4.0, DBP absorption number: 620 g/100 g), 20 mmol of a compound represented by Chemical structural 1 below, and 200 mL of deionized highly pure water were mixed in a room-temperature environment with a Silverson mixer at 6,000 rpm.

When the obtained slurry had a pH higher than 4, 20 mmol of nitric acid was added. Thirty minutes later, 20 mmol of sodium nitrite dissolved in a minute amount of deionized highly pure water was slowly added to the mixture. The resulting mixture was stirred to allow reaction for one hour while the temperature was raised to 60 degrees C. A reformed pigment was produced in which the compound represented by Chemical structure 1 illustrated below was added to the carbon black.

A dispersion of reformed pigment was obtained 30 minutes later by adjusting the pH to be 10 by NaOH aqueous solution. A dispersion containing a pigment bonded with at least one geminal-bisphosphonic acid group or a sodium salt of geminal bisphosphonic acid and deionized highly pure water were subject to ultrafiltering using a dialysis membrane followed by ultrasonic wave dispersion to obtain self-dispersible black pigment dispersion having a bisphosphonic acid group as a hydrophilic group with a pigment solid concentration of 16 percent.

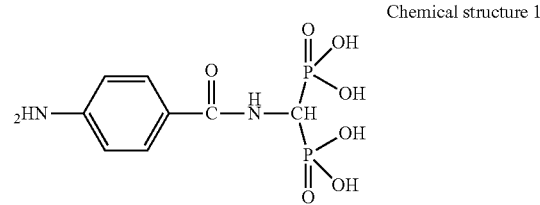

Chemical structure 1

Preparation Example of Liquid Composition 1 (Ink)

The black-pigment dispersion at 50.00 percent by mass (pigment solid content concentration: 16 percent), polyethylene wax at 2.22 percent by mass (AQUACER 531, non-volatile content: 45 percent by mass, manufactured by BYK Japan KK., 30.00 percent by mass of 3-ethyl-3-hydroxymethyloxetane, 10.0 percent by mass of propylene glycol monopropyl ether, and silicone-based surfactant at 2.00 percent by mass (TEGO Wet 270, manufactured by TOMOE ENGINEERING CO., LTD.) were mixed with deionized water as a balance. The mixture was stirred for one hour, and subsequently filtered through a membrane filter having an average pore size of 1.2 μm, to obtain liquid composition 1 (ink). Viscosity of the liquid composition 1 had a viscosity of 8 mPa·s and a static surface tension of 30 mN/m. Viscosity and static surface tension were measured as follows.

Measuring of Viscosity

Viscosity of the liquid composition 1 was measured at 25 degrees C. using a viscometer (RE-550L, manufactured by TOKI SANGYO CO., LTD.).

Measurement of Static Surface Tension

Static surface tension of the liquid composition 1 was measured at 25 degrees C. using an automatic surface tensiometer (DY-300, manufactured by KYOWA INTERFACE SCIENCE Co., Ltd.).

Example 1

Production of Contact Member

A silicone-based adhesive (KE-45T, manufactured by Shin-Etsu Chemical Co., Ltd.) was applied by an applicator to the surface of a hollow aluminum roller (manufactured by MISUMI Group Inc.) having a straight tubular form with a diameter of 75 mm such that the adhesive had a thickness of 200 μm. TOYOFLON BF-8005-1000 (unwoven fabric, manufactured by Toray Industries, Inc.), as a liquid composition holding layer, was wound round and attached to the resulting roller followed by applying a linear pressure of 30 N/cm from the surface side using an elastic roller and allowing to leave for 24 hours to manufacture a contact member 1. The contact angle of pure water on the liquid composition holding layer of the contact member 1 was 125 degrees. The contact angle of pure water on the liquid composition holding layer was measured as follows.

Measurement of Contact Angle

The contact angle was measured by a contact angle meter (DMo-501, manufactured by Kyowa Interface Science, Inc.). A total of 10 μl of liquid droplets was dripped to the surface of a measuring target and the contact angle thereof at 5,000 ms after the dripping was measured at 25 degrees C.

Manufacturing of Inkjet Printing Device

An inkjet printing system (RICOH Pro VC60000, manufactured by Ricoh Co., Ltd.) was remodeled by incorporating the contact member 1. The contact member 1 was filled with the liquid composition 1 (ink). The contact member was incorporated at a position downstream of a drying device for drying the applied liquid composition 1 (ink) in the conveyance path in the printing device such that the contact member first made contact with the liquid-composition-1 applied region.

Thickness of Liquid Composition Holding Layer and Thickness Proportion of Adhesive Layer A contact member was cut perpendicularly to the interface between the core and the adhesive layer to expose the cross sectional surface of the contact member. An imaginary line was drawn through the mixed region of the adhesive layer and the resin fiber constituting the liquid composition holding layer farthermost from the core and parallel to the surface of the core. The region above this line was classified as the liquid composition holding layer and the region below this layer and above the core was classified as the adhesive layer. The layer above this line was determined as the liquid composition holding layer and the region below this layer and above the core was determined as the adhesive layer.

The length in the liquid composition holding layer perpendicular to the interface between the core and the adhesive layer was determined as the thickness of the liquid composition holding layer and measured. The length in the adhesive layer perpendicular to the interface between the core and the adhesive layer was determined as the thickness of the adhesive layer and measured. The thickness proportion (percent) of the thickness of the adhesive layer to the thickness of the liquid composition holding layer was calculated. The thickness of the liquid composition holding layer and the proportion of the thickness of the adhesive layer to the thickness of the liquid composition holding layer are shown in Table 1.

The lengths were measured at 9 points. A position at 1 cm inside from one end of the contact member, a position at the center of the contact member, and a position at 1 cm inside from the other end of the contact member. Three points present on the circumference of the contact member spaced 120 degrees apart for each of the three positions were selected (9 points in total). The part in the liquid composition holding layer inside less than 1 cm from the ends were excluded for measuring. The results are shown in Table 1 and all the values were the same at any measuring points.

Examples 2 to 7 and Comparative Examples 1 to 3

Contact members and printing devices of Examples 2 to 7 and Comparative Examples 1 to 3 were manufactured in the same manner as in Example 1 except that the type of the liquid composition holding layer, the thickness of the liquid composition holding layer, the proportion of the thickness of the adhesive layer to the thickness of the liquid composition holding layer, and the forms of the hollow aluminum roller were changed as shown in Table 1 The thickness of the liquid composition holding layer and the proportion of the adhesive layer to the liquid composition holding layer were adjusted by changing the amount of the silicone-based adhesive applied and the linear pressure applied.

A model ink 1, in which black pigment dispersion at 5.0 percent by mass (solid content concentration of 16 percent) was added to pure water at 95.00 percent by mass, was used in place of the liquid composition 1 in Comparative Example 2.

A model ink 2, which was obtained by heating and stirring the liquid composition 1 at 50 degrees C. for 24 hours such that the mass was reduced to 80 percent after the heating and stirring, was used instead of the liquid composition 1 in Comparative Example 3.

The product names and the manufacturing companies of the fibers shown in Table 1 are as follows:
TOYOFLON BF-800S-500 (fluororesin fiber, manufactured by Toray Industries, Inc.)
TOYOFLON BF-800S-1000 (fluororesin fiber, manufactured by Toray Industries, Inc.)
TOYOFLON BF-800S-1500 (fluororesin fiber, manufactured by Toray Industries, Inc.)
TOYOFLON BF-800S-2000 (fluororesin fiber, manufactured by Toray Industries, Inc.)
Tommy Filec PA1OLH (manufactured by TOMOEGAWA CO., LTD.)
TOYOFLON 406D (fluororesin fiber, manufactured by Toray Industries, Inc.)

Background Fouling

Background fouling of the contact members manufactured in Examples and Comparative Examples mentioned above was evaluated.

First, 0.1 mg of the liquid composition (ink) was dripped to the contact member. An inkjet printing system (RICOH Pro VC60000, manufactured by Ricoh Co., Ltd.) was remodeled by incorporating the contact member to which the liquid composition (ink) had been applied and conveyed a contact-target member as a recording medium. The contact member was incorporated at a position downstream of a drying device for drying the applied liquid composition (ink) in the conveyance path in the printing device such that the contact member first made contact with the ink-applied region. The recording medium used was roll paper (Lumi Art Gloss 130 gsm, paper width: 520.7 mm, manufactured by Stora Enso). The roll paper was set to be conveyed at 50 m/minute. The conveyance length of the recording medium after the conveyance was measured when the liquid composition (ink) transferred from the contact member had disappeared and evaluated on background fouling according to the following evaluation criteria. The results are shown in Table 1. The contact member was determined as usable for practical purpose when graded C or above.

Evaluation Criteria

A: 100 m or less
B: More than 100 m to 1000 m
C: More than 1000 m to 5000 m
D: Ink fouling still present after 5000 m Peeling Property Peeling property of the contact members manufactured in Examples and Comparative Examples mentioned above was evaluated.

An evaluation surface having a width of 30 mm and a length of 100 mm was created by cutting a contact member surface layer perpendicularly with a razor and the end having a shorter width was gripped by a digital force gauge (manufactured by A&D Company, Limited) and the 90 degree peeling stress was measured at 5 seconds/100 mm. The maximum in the measuring distance of 100 mm was determined as the measuring value and the peeling stress was measured at three different measuring positions in the contact member. The average was adopted as the peeling stress. The results are shown in Table 1. B and above in the following evaluation criteria were determined as usable for practical purpose.

Evaluation Criteria

A: 9 N/cm or greater
B: 6 N/cm to less than 9 N/cm
C: 3 N/cm to less than 6 N/cm
D: Less than 3 N/cm

TABLE 1

| | Properties of liquid composition | | Manufacturing condition of contact member | | | |
|---|---|---|---|---|---|---|
| | Viscosity (mPa·s) | Static surface tension (mN/m) | Liquid composition holding layer | | Roller form | Contact angle of pure water (degree) |
| Example 1 | 8 | 30 | TOYOFLON BF-800S-1000 | Non-woven fabric | Straight tubular form φ75 | 125 |
| Example 2 | 8 | 30 | TOYOFLON BF-800S-500 | Non-woven fabric | Straight tubular form φ75 | 125 |
| Example 3 | 8 | 30 | TOYOFLON BF-800S-1500 | Non-woven fabric | Straight tubular form φ75 | 125 |
| Example 4 | 8 | 30 | Tommy Filec PA10LH | Non-woven fabric | Straight tubular form φ75 | 135 |
| Example 5 | 8 | 30 | TOYOFLON BF-800S-1000 | Non-woven fabric | Straight tubular form φ75 | 125 |
| Example 6 | 8 | 30 | TOYOFLON BF-800S-500 | Non-woven fabric | Straight tubular form φ75 | 125 |
| Example 7 | 8 | 30 | TOYOFLON 406D | Woven fabric | Straight tubular form φ75 | 115 |
| Comparative Example 1 | 8 | 30 | TOYOFLON BF-800S-2000 | Non-woven fabric | Straight tubular form φ75 | 125 |
| Comparative Example 2 | 1 | 19 | TOYOFLON BF-800S-1000 | Non-woven fabric | Straight tubular form φ75 | 125 |
| Comparative Example 3 | 15 | 55 | TOYOFLON BF-800S-500 | Non-woven fabric | Straight tubular form φ75 | 125 |

| | Manufacturing condition of contact member | | Evaluation result | | | |
|---|---|---|---|---|---|---|
| | Thickness of liquid composition holding layer (μm) | Thickness proportion of adhesive layer (percent) | Background fouling | | Peeling property | |
| | | | Length of conveyance (m) | Evaluation | Peeling stress (N/cm) | Evaluation |
| Example 1 | 800 | 25 | 600 | A | 8 | A |
| Example 2 | 400 | 25 | 800 | B | 8 | B |
| Example 3 | 1200 | 25 | 550 | B | 6 | B |
| Example 4 | 700 | 29 | 80 | A | 8 | A |
| Example 5 | 950 | 5 | 600 | A | 8 | C |
| Example 6 | 350 | 43 | 1200 | C | 11 | C |
| Example 7 | 800 | 25 | 700 | B | 9 | A |
| Comparative Example 1 | 1600 | 25 | 600 | B | 2 | D |
| Comparative Example 2 | 800 | 25 | >5000 | D | 3 | C |

TABLE 1-continued

| | | | | | | |
|---|---|---|---|---|---|---|
| Comparative Example 3 | 400 | 25 | >5000 | D | 6 | B |

This patent application is based on and claims priority to Japanese Patent Application No. 2019-160416, filed on Sep. 3, 2019, respectively, in the Japan Patent Office, the entire disclosure of each of which is hereby incorporated by reference herein.

REFERENCE SIGNS LIST

1. Contact-target member supply device
2. Liquid composition applying device
3. Liquid composition heating device
4. Contact member
5. Contact member heating device
6. Contact-target member retrieving device
7. Contact-target member
8. Conveyance path
9a and 9b. End portion where contact-target member is separated from contact member
10. Core
11. Adhesive layer
12. Liquid composition holding layer
13. Liquid composition container
14. Supply device
15. Liquid composition
100. Printing device

The invention claimed is:

1. A printing device, comprising:
   a liquid composition having a viscosity of from 2 to 15 mPa·s and a static surface tension of from 20 to 50 mN/m;
   a liquid composition container that contains the liquid composition;
   a liquid composition applying device configured to apply the liquid composition to a contact-target member; and
   a contact member configured to make contact with a region to which the liquid composition has been applied in the contact-target member,
   wherein the contact member comprises a liquid composition holding layer configured to hold the liquid composition, an adhesive layer that fixes the liquid composition holding layer, and a core in this order from a side that makes contact with the region,
   wherein the liquid composition holding layer has a thickness of from 200 to 1,300 μm.

2. The printing device according to claim 1, wherein a contact angle of pure water on the liquid composition holding layer is 120 degrees or more.

3. The printing device according to claim 1, wherein the liquid composition has a viscosity of from 2 to 10 mPa·s and a static surface tension of from 20 to 35 mN/m.

4. The printing device according to claim 1, wherein the liquid composition holding layer comprises a fluororesin fiber layer.

5. The printing device according to claim 4, wherein the fluororesin fiber layer comprises a non-woven fabric.

6. The printing device according to claim 1, wherein the liquid composition holding layer has a thickness of from 500 to 1,000 μm.

7. The printing device according to claim 1, wherein a thickness proportion of the adhesive layer to the liquid composition holding layer is from 3 to 50 percent.

8. The printing device according to claim 1, wherein a thickness proportion of the adhesive layer to the liquid composition holding layer is from 10 to 40 percent.

9. The printing device according to claim 1, wherein the core has a roller form.

10. The printing device according to claim 9, wherein the core has a roller form with a diameter of a cross section of the core decreasing from both ends to a center.

11. The printing device according to claim 1, wherein the contact-target member comprises a recording medium.

12. The printing device according to claim 1, wherein the printing device conveys the contact-target member at 50 m/minute or more.

13. The printing device according to claim 1, wherein a length of the contact-target member along a conveying direction is longer than a length of a conveyance path of the contact-target member in the printing device.

14. The printing device according to claim 1, wherein the contact member is a first member that makes contact with the region.

15. The printing device according to claim 1, wherein the contact-target member comprises a substrate and an application layer disposed on at least one side of the substrate, wherein transfer amounts of pure water to the contact-target member at a contact time of 100 ms and 400 ms are respectively 2 to 35 mL/m$^2$ and 3 to 40 mL/m$^2$ as measured by a dynamic scanning absorptometer.

16. The printing device according to claim 1, further comprising a liquid composition heating device configured to heat the liquid composition the region that has been applied to the contact-target member from a rear side to a side having the region, wherein the contact member makes contact with the region of the contact-target member after the liquid composition is heated by the liquid composition heating device.

17. A contact member, comprising:
   a liquid composition holding layer configured to hold a liquid composition having a viscosity of from 2 to 15 mPa·s and a static surface tension of from 20 to 50 ml m;
   an adhesive layer that fixes the liquid composition holding layer; and
   a core,
   wherein the contact member is configured to make contact with a region to which the liquid composition has been applied in a contact-target member,
   wherein the liquid composition holding layer, the adhesive layer, and the core are disposed in this order from a side that makes contact with the region,
   wherein the liquid composition holding layer has a thickness of from 200 to 1,300 μm.

18. A drying device, comprising:
   a contact member comprising:
      a liquid composition holding layer configured to hold a liquid composition having a viscosity of from 2 to 15 mPa·s and a static surface tension of from 20 to 50 mN/m;
      an adhesive layer that fixes the liquid composition holding layer; and
      a core;

wherein the contact member is configured to make contact with a region to which the liquid composition has been applied in a contact-target member, wherein the liquid composition holding layer, the adhesive layer, and the core are disposed in this order from a side that makes contact with the region, wherein the liquid composition holding layer has a thickness of from 200 to 1,300 µm, wherein the drying device is configured to dry the contact-target member to which the liquid composition has been applied.

* * * * *